United States Patent [19]

Tada

[11] Patent Number: 5,298,818
[45] Date of Patent: Mar. 29, 1994

[54] THRUST GENERATOR

[76] Inventor: Eiichi Tada, 15-2, Komyodai 3-chome, Izumi-shi, Osaka 590-02, Japan

[21] Appl. No.: 858,986
[22] PCT Filed: Sep. 20, 1991
[86] PCT No.: PCT/JP91/01250
§ 371 Date: May 21, 1992
§ 102(e) Date: May 21, 1992
[87] PCT Pub. No.: WO92/05621
PCT Pub. Date: Apr. 2, 1992

[30] Foreign Application Priority Data

Sep. 21, 1990 [JP] Japan .................. 2-253380

[51] Int. Cl.$^5$ .................. H02K 44/04
[52] U.S. Cl. .................. 310/11; 290/54; 290/42; 440/3
[58] Field of Search .................. 310/11; 290/52, 53, 290/54, 42; 440/3; 417/50

[56] References Cited

FOREIGN PATENT DOCUMENTS 62-160991 7/1987 Japan .
9107806 5/1991 PCT Int'l Appl. .

*Primary Examiner*—Steven L. Stephan
*Assistant Examiner*—Judson H. Jones
*Attorney, Agent, or Firm*—Burns, Doane, Swecker & Mathis

[57] ABSTRACT

A thrust generator including a superconducting solenoid magnet 1, a thrust duct 2 and a power supply device 3. The spiral portion of the thrust duct 2 is inserted in the hollow interior of the superconducting solenoid magnet 1. Anode 8 and cathode 9 are fixed at both inner walls of the thrust duct 2. Electric power is supplied to an electromagnetic fluid 10 in the duct 2 to produce a magnetic field and a Lorentz's force f. The electromagnetic fluid 10 flows into the thrust duct 2 through an opening 6a at the inlet end portion 6 where it is urged continuously by the Lorentz's force F and jetted outside from an opening 7a at the outlet end portion 7. The reaction of the jet force becomes a thrust. A Lorentz's force f, generated by the superconducting solenoid magnet 1 and by the current J flowing through each current feed element, rotates and drives the thrust duct 2.

16 Claims, 7 Drawing Sheets

5,298,818

THRUST GENERATOR

BACKGROUND OF THE INVENTION

1. Field of the Invention

The present invention relates to a thrust generator which may be used as a superconducting Electro Magnetic Thruster (hereinafter referred as EMT) for ship propulsion devices, a Dynamic Positioning System for ocean platforms, an Electro-Magnetic pump for an electrically conductive fluid, such as, sea water, an MHD generator, and pumps and generators of pumping-up power systems. Conventionally, diploe, quadruple, saddle and racetrack type superconducting magnets are used for EMTs. These conventional EMTs may however, be too big and too heavy to provide enough thrust for full-scale ships and may be difficult to construct. Their magnetic field must be strong enough on 10 to 20 Teslas to obtain the efficient propulsion of EMT ships. The EMT having such a strong magnetic field may be while the size and weight of an on-board EMT propulsion device is limited by available hull space. Consequently, the size, weight, thrust force and high magnetic field of conventional EMTs has proven unsatisfactory. In view of this, there is an important technical problem to develop EMTs for practical use.

2. Description of the Prior Art

A previous application by the present inventor, PCT/JP89/01153, disclosed a light weight and compact thrust generator includes superconducting magnets. According to that previous application, the superconducting EMT generator includes a superconducting solenoid magnet and a helical or spiral thrust duct with a pair of electrodes inserted in the hollow interior of the superconducting solenoid coil magnet. The openings of the inlet and the outlet of the spiral duct are provided along the longitudinal center axis of the solenoid coil magnet. In the case of sea water as a conductive fluid flowing the thrust duct an anode, or positive electrode, is arranged continuously on the inner side wall of the duct and a cathode, or negative electrode, is opposed to the outer side wall of the duct.

SUMMARY OF THE INVENTION

The present invention improves upon the thrust generator disclosed in the previous application. In the thrust generator of the previous application as, the velocity of electromagnetic fluid flow increases, the propulsive energy efficiency, decreases due to frictional losses between the thrust duct wall and the fluid.

The present invention provides a thrust generators-with higher thrust and higher propulsive efficiency, and reduces fluid frictional losses by matching the velocity of the thrust duct with the velocity of the fluid by rotation of the thrust duct.

The present thrust generator has a structure wherein a helical duct is rotatably supported inside a hollow portion of a superconducting magnet of a solenoid coil type. An electromagnetic fluid, such as sea water flows through the thrust duct, and an electric current is supplied from a current feeder to the electromagnetic fluid inside the thrust duct so as to generate a Lorentz's force in magnetic fluid. The current feeders are mounted on the trust duct at equal intervals around the thrust duct. A Lorentz's force is also generated in each element of the current feeder by the magnetic field generated by the superconducting magnet and the electrode current flowing through each element. The Lorentz's force generated in the current feeders then rotates and drives the thrust duct.

The thrust generator according to the present invention may include a power busbar apparatus for, supplying the electric current into current feeders. The power busbar apparatus is made up of ringbars fixed at the center of the thrust duct and straight busbars in the longitudinal axis of the thrust duct for making contact with the current feeders.

The power busbar apparatus can be divided into rotatable structure and stationary structure types. In the case of the rotatable structure type providing the ability to rotate with the thrust duct, the power busbar apparatus is fixed to the current feeders mounted in the thrust duct and has slide terminals or roller terminals that make contact with the power supply generator. The roller type terminals provide simple and compact structures for reducing sliding friction. In the case of the stationary structure type, the power busbar apparatus has ring busbars between stationary straight busbars of the power busbar apparatus. In this type, the sliding friction is so large but makes the weight supporters and the power busbar apparatus in a body.

In the case of sea water as a conductive fluid flowing in the thrust duct, an anode is preferably arranged on the inner side wall of the duct and a cathode is opposed to the outer side wall of the duct in order to counteract the decreasing effective electrochemical reaction area of the electrode caused by the production of hydrogen bubbles at the cathode. It is possible to generate the maximum thrust when the ratio of outer radius to inner radius of the thrust duct 3.5.

DESCRIPTION OF THE PREFERRED EMBODIMENT

Figure 1:
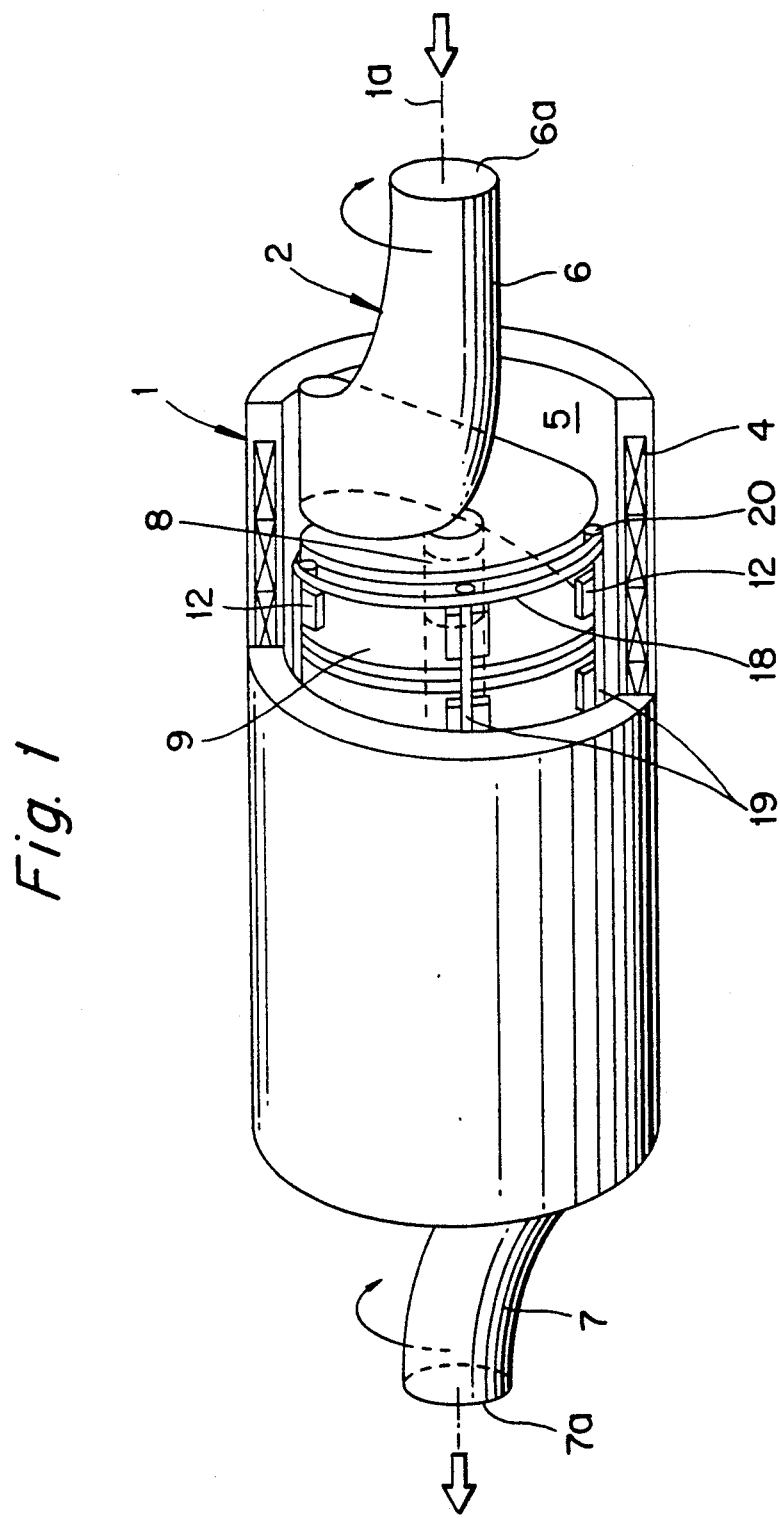
FIG. 1 shows a cut-away drawing of a device adopting the present invention.

Preferred embodiment of the present invention will now be described hereinafter referring accompanying drawings. The thrust generator of the present invention provides a superconducting solenoid coil magnet 1, a rotatable spiral thrust duct 2 and a power supply device 3. The superconducting magnet 1 provides a coil 4 wound by superconducting wires set in a highly efficient thermal insulated container of cryostat. The superconducting solenoid magnet generates a strong magnetic field in the hollow interior 5 of the magnet. The superconducting solenoid magnet 4 is operating in the persistent current mode or by connecting with power supply lines. The winding concept of the superconducting solenoid magnet 4 may be a pancake type or a layered type.

The thrust duct 2 is a rotatable spiral hollow one with rectangular cross section. The spiral portion of the thrust duct 2 is inserted in the hollow interior of the superconducting solenoid magnet 1. Both an inlet 6 and an outlet 7, each having an opening 6a, 7a, of the thrust duct 2 extend along the longitudinal center axis 1a of the superconducting solenoid magnet 1. There is, however, no restriction concerning with cross section form of the thrust duct 2 in the present invention. The thrust duct is supported by support devices such as rollers and so on.

Electrodes 8,9 are fixed at both walls of the thrust duct 2. The anode 9 is arranged on the inner side wall of the thrust duct 2, and the cathode 9 is opposed to the outer side wall of the thrust duct 2 because of decreasing effective electrochemical reaction area of the cathode 9 caused by the production of hydrogen bubbles. The present invention is not restricted concerning arrangements of electrodes.

The power supply device 3 consists of plural current feeders 11, 12 and a power busbar apparatus 13, 14. In the inside portion of the thrust duct 2, the inner current feeders 11 are set at 90 degree intervals. In the area between outside of the thrust duct 2 and inside of the superconducting solenoid magnet 1, outer current feeders 12 are set at 45 degree intervals. Each of current feeders 11, 12 is mounted and fixed in the thrust duct 2 connecting inner current feeders to anode 8 and outer current feeders to cathode 9.

The inner power busbar apparatus 13 is made up of a small ringbar 15 and four straight busbars 16 extending from the ringbar 15. The ringbar 15 is placed in concentric center of the thrust duct 2, making contact with roller terminals 17,17 in the inner wall of the ringbar 15. The straight busbar 16 is inserted into the inside portion of the thrust duct 2 at a position corresponding to the inner current feeders 11, its length being along the longitudinal axis of the thrust₁duct 2 and making contact with all inner current feeders 11.

The outer power busbar apparatus 14 is made up of a ringbar 18 and eight straight busbars 19 extending from the ringbar 18. The ringbar 18 is placed concentric with the center of the thrust duct 2, making contact with roller terminals 20 in the inner wall of the ringbar 18. The straight busbar 19 is inserted into the outside portion of the thrust duct 2 at a position corresponding to the outer current feeders 12, its length being along the longitudinal axis of the thrust duct 2, and making contact with all inner current feeders 12.

In the present embodiment the electrode current is supplied from the roller terminals 17,17 of the inner power busbar apparatus 13, to the ringbar 15, to the four straight bursars 16, to the inner current feeders 11, to the anode 8, and at last into the electromagnetic fluid 10. The supplied electrode current flows from the electromagnetic fluid 10, to the cathode 9, to outer current feeders 12, to straight busbars 19, to the ringbar 18, to the roller terminals 20.

Figure 2:
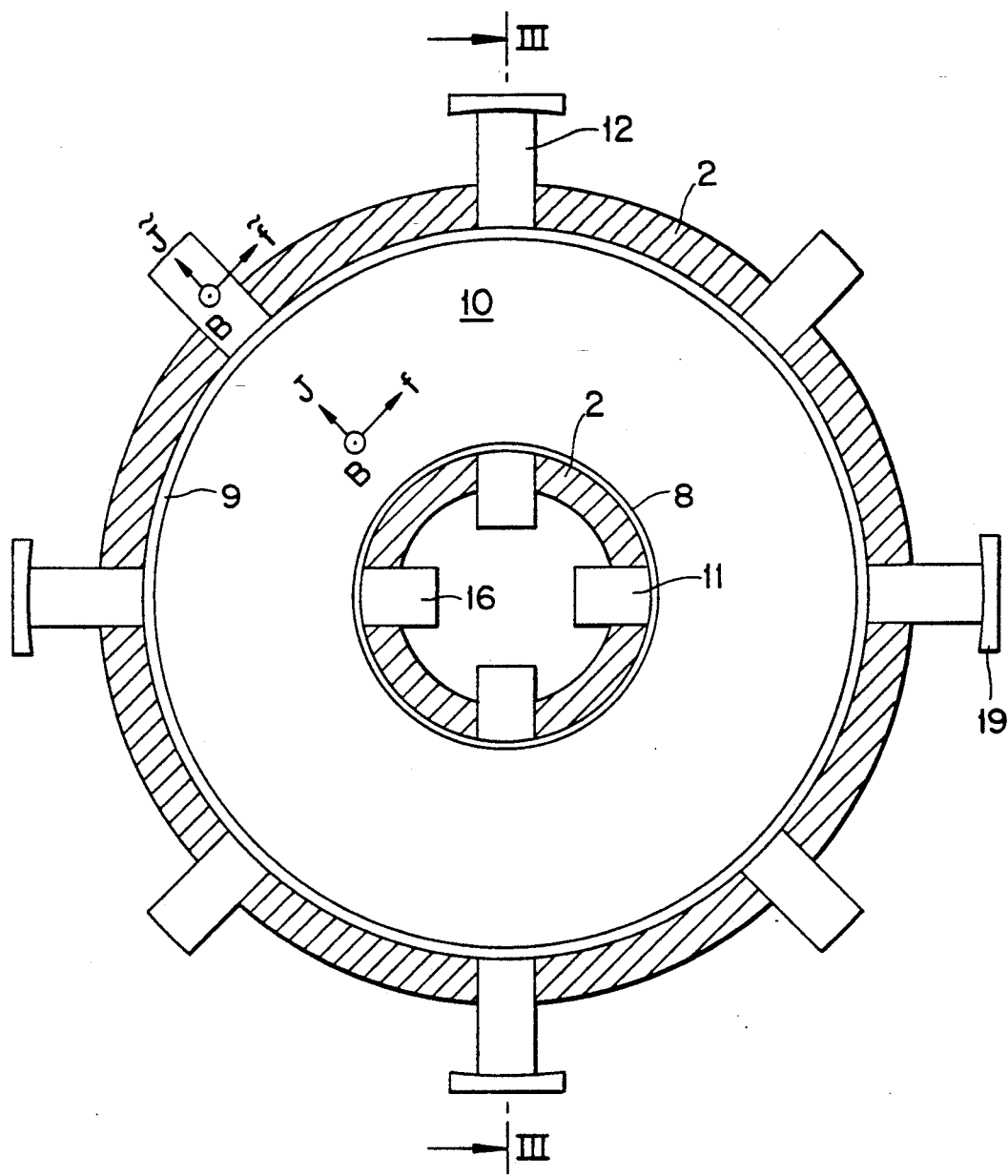
FIG. 2 shows an enlarged detail drawing.
Figure 3:
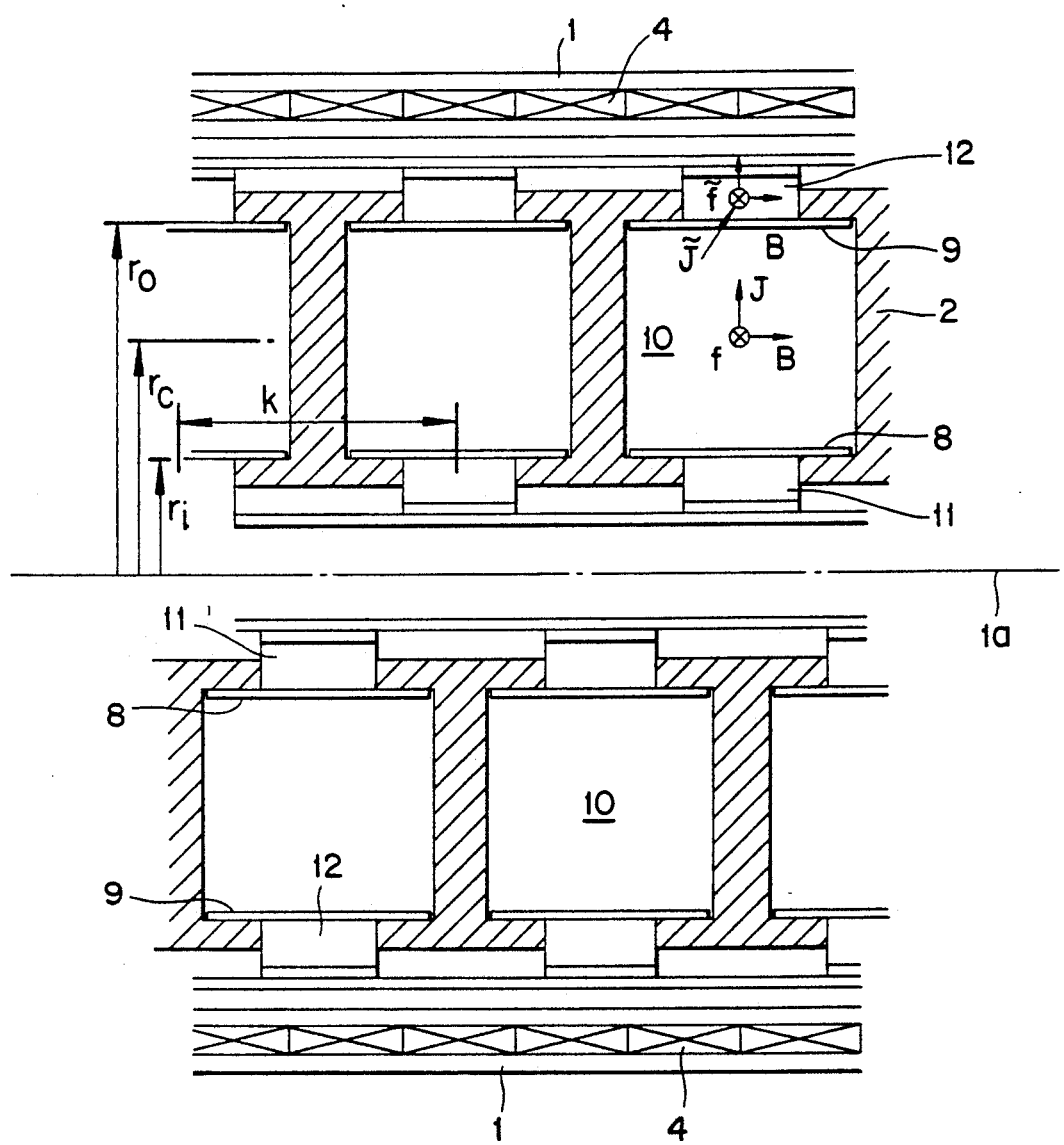
FIG. 3 shows a cross section along arrow III—III in FIG. 2.
Figure 4:
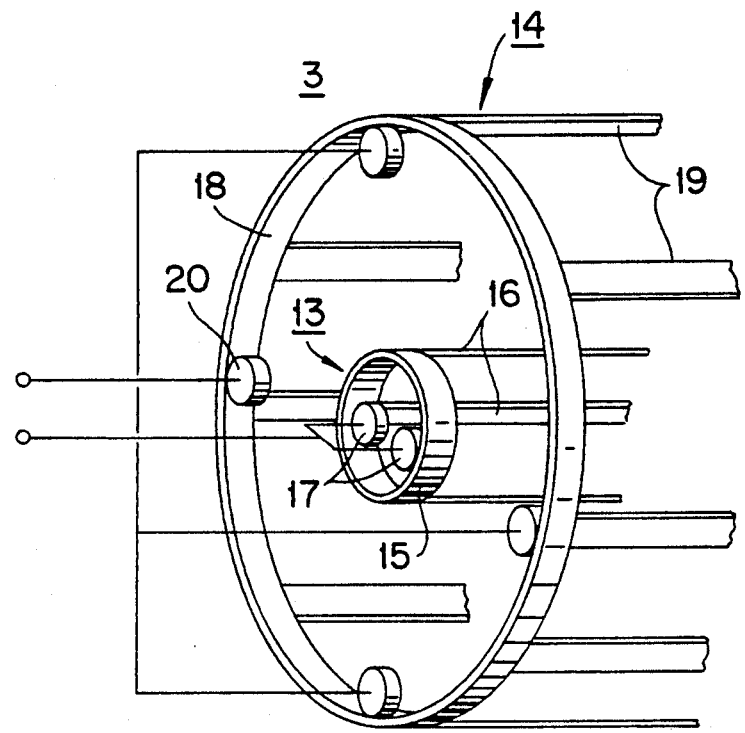
FIG. 4 shows a general layout illustration of a power busbar apparatus.

In FIG. 2, the reaction between the magnetic field B generated by the fixed superconducting solenoid magnet 1 and the electric current J passing through the sea water from anode 8 to cathode 9 generates a Lorentz's force F whose direction is shown by arrow F. The electromagnetic fluid 10 flows into the thrust duct 2 through an opening 6a at the inlet end portion 6 and is pressed continuously the Lorentz's force F inside the thrust duct 2. The electromagnetic fluid is accelerated by this force and is jetted outside from an opening 7a at the outlet end portion 7. The reaction of the jet force becomes a thrust.

The input electric power P (W) is calculated from the following equations, $$P = J \cdot V = j^2 \cdot (r_c^2/s) \cdot 2\pi l \cdot \ln(r_o/r_i)$$

$$V = [(r_c j)/\sigma] \cdot \ln(r_o/r_i)$$

$$J = j(2\pi r_c b)n = j(2\pi r_c)l$$

where;

j: Electric current density at the reference radius rc(A/m$^2$)
rc: Reference radius (ri+ro)/2 (m)
ro: Outer radius of the thrust duct (m)
ri: Inner radius of the thrust duct (m)
b: Cell length of the thrust duct (m)
n: .Number of cell of the thrust duct
l: Overall length of the thrust duct (m)
$\sigma$: Sea water electric conductivity (S/m)

The Lorentz's force F (N) is calculated from the following relation, $$\begin{aligned} F &= j \cdot B \cdot S \\ &= j \cdot B(r_o^2 - r_i^2) \cdot \pi b n \\ &= j \cdot B(r_o^2 - r_i^2) \cdot \pi l \end{aligned}$$

Substituting the Lorentz's force relation into the input power equation, $$F^2 = \frac{P\sigma \cdot B^2 \pi l/2 \cdot (r_o^2 - r_i^2)^2}{r_c^2 \cdot \ln(r_o/r_i)},$$

which results in, $$F^2 = 4A \cdot \frac{(r_o^2 - r_i^2)^2}{\ln(r_o/r_i)}$$

where A is defined as follows, $$A = P\sigma \cdot B^2 \pi l/2$$

The Maximum Lorentz's force is obtained when it is satisfied with the following relation.

$$\delta F^2/\delta r_i = 0$$

Numerical solutions show that the maximum Lorentz's force is able to be gained when the thrust duct dimension is satisfied with the relation, ro=3.5 ri. The experimental results supported the analytic results.

In a similar way, the Lorentz's force f is also generated in each element of the inner and outer current feeders 11,12 by the magnetic field B produced by the superconducting solenoid magnet 1 and by the current J flowing through each element of current feeders. The Lorentz force generated in each element of the inner and outer current feeders rotates and drives the thrust duct 2.

Figure 5:
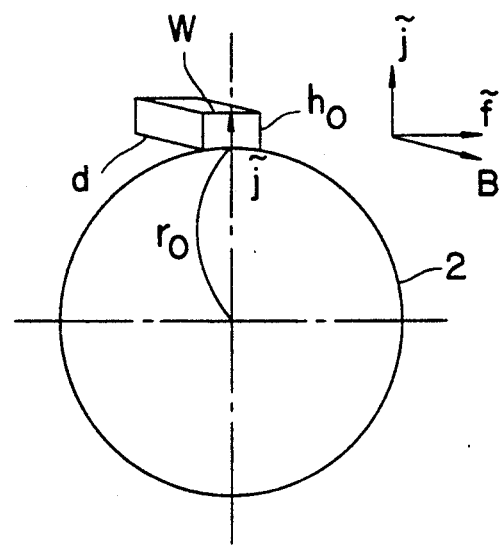
FIG. 5 shows the Lorentz's force in a element of a current feeder.

The rotating force generated in each element of the current feeders in FIG. 5 will now be explained. FIG. 5 shows in case of the outer current feeders 12.

Given the dimensions as shown in FIG. 5, w(m) in width, ho (m) in thickness, d (m) in length, the average current density j is obtained as follows:

$$j = (J/mn)(1/dw) \quad (A/m^2)$$
$$f_0 = j \cdot B$$
$$= (J/mn)(1/dw)B \quad (N/m^3)$$

The Lorentz's force fe for only one outer current feeder is given by the following, $$f_e = f_0 d w h_0 \quad (N)$$

Consequently, the total Lorentz's force Fe acting on (m×n) current feeders is, $$F_e = mn f_e$$
$$= mn(J/mn)(w/dh_0)Bdwh_0$$
$$= JBh_0 \quad (N)$$

In the present analysis, the Lorentz's force depends on the thickness ho of current feeders under a constant magnetic field B and a constant electrode current J. The rotating moment To acting on the thrust duct 2 is calculated from the followings, $$T_o = mnf_e \cdot 2r_o$$
$$= 2JBh_o r_o$$

By the same way, the rotating moment Ti by the inner current feeders is obtained from $$T_i = 2JBh_i r_i$$

where hi is the thickness of the inner current feeders and ri the inner radius of the thrust duct 2.

The resultant rotating moment T acting on the thrust duct is calculated from the following equation, $$T = 2JB(h_o r_o + h_i r_i) \quad (Nm)$$

For example, in the case of electrode current J=4000(A), magnetic field B=10(T), inner radius of the thrust duct ri=0.228(m), outer radius of the thrust duct ro=0.8(m) and thickness of current feeders hi=ho=0.1(m), the inner, outer and total rotating moment acting the thrust duct are computed, respectively, $$T_o = 6400(Nm) = 653(kgf \cdot m)$$
$$T_i = 1824(Nm) = 186(kgf \cdot m)$$
$$T = 8224(Nm) = 839(kgf \cdot m)$$

Figure 6:
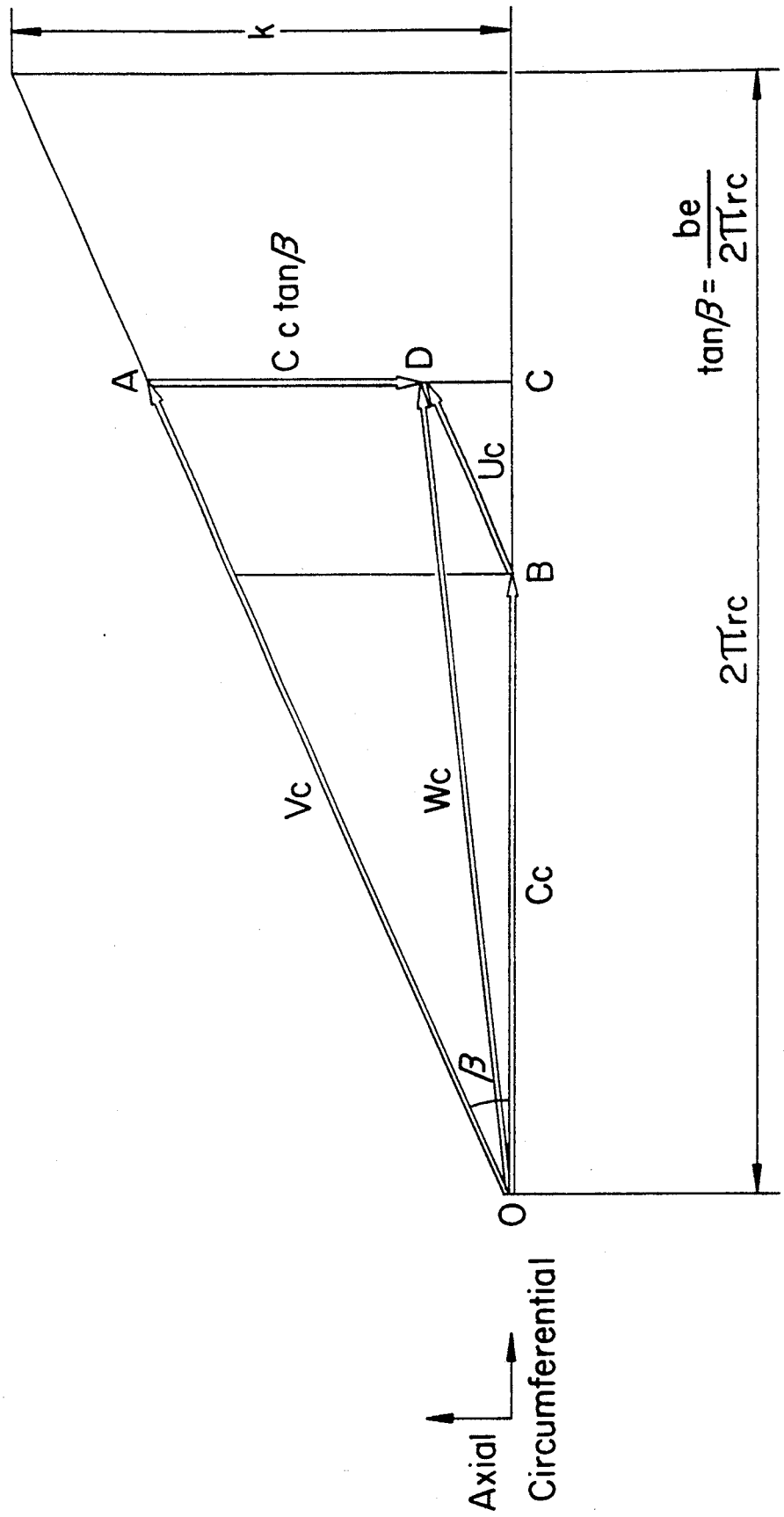
FIG. 6 shows a velocity diagram including a rotational velocity of a thrust duct and a flow velocity of an electromagnets fluid.

FIG. 6 shows the thrust duct, introducing leed k and leed angle B of the thrust duct defined by a longitudinal direction gain against one revolution of the thrust duct. Assuming frictionless or slip between fluid and the wall of the thrust duct, uniform and steady flow, and the thrust duct being stationary, the electromagnetic fluid 10 flows in direction of $\overline{OA}$ with its velocity Vc. And now, rotating the thrust duct in circular direction of $\overline{OB}$ with its velocity Cc, the electromagnetic fluid 10 is pressed by the wall of the thrust duct 2 and moves in direction of $\overline{AD}$, its moving velocity Cc tan ($\beta$), where tan ($\beta$)=k/(2$\pi$rc). Then in view of a stationary coordinate, the fluid 10 flows in absolute direction of $\overline{OD}$ with its velocity Wc. On the other hand, in a rotative coordinate of the rotating thrust duct, the fluid 10 flows in the relative direction $\overline{BD}$ with a proportional velocity calculated as follows, $$U_c \cdot V_c = V_c \cos\beta - C_c \cdot V_c \cos\beta$$
$$U_c = V_c(V_c \cos\beta - C_c)/V_c \cos\beta$$
$$= (V_c \cos\beta - C_c)/\cos\beta$$
$$= V_c - (C_c/\cos\beta)$$

That is, for thrust duct 2 being stationary, the velocity difference between the electromagnetic fluid 10 and the wall of the thrust duct 2 is Vc. In the case of thrust duct rotating with the circular velocity Cc, the velocity difference between the electromagnetic fluid 10 and the wall of the thrust duct 2 is Uc which is smaller than Vc. Therefore, the fluid frictional loss of rotating the thrust duct is able to be reduced greatly in comparison with the stationary thrust duct because of frictional loss being depend to square of the velocity difference.

By introducing an angular acceleration $\omega$, the revolution n (rpm) of the thrust duct in order to obtain the circular velocity Cc may be obtained from the following relation, $$n = (30/\pi) \cdot (C_c/r_c)(rpm)$$
$$C_c = r_c \omega = r_c 2\pi n/60$$

And the ratio of Uc to Vc, so that the ratio of diminution of frictional loss is given by the following relation $$U_c/V_c = \{V_c - (C_c/\cos\beta)\}/V_c$$
$$= 1 - (C_c/V_c) \cdot (1/\cos\beta)$$

Figure 7:
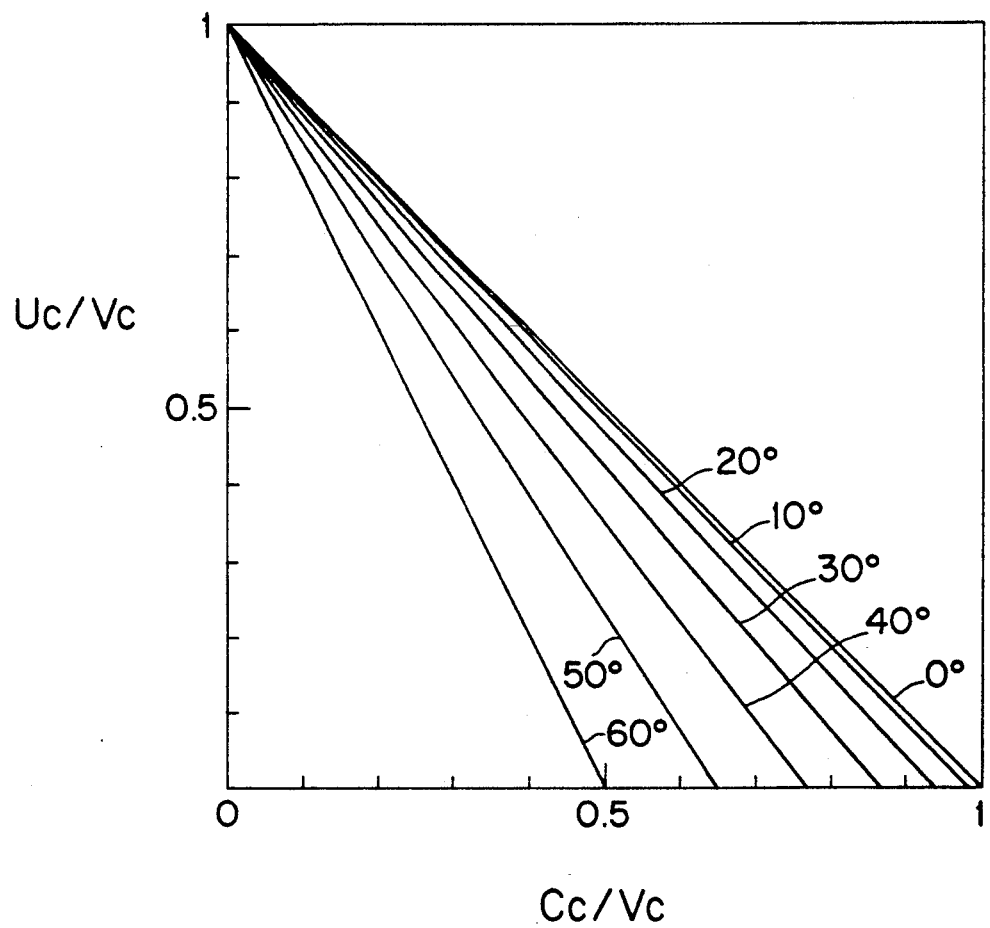
FIG. 7 shows the frictional loss against a rotational velocity of a thrust duct.

The calculated results are plotted in FIG. 7. FIG. 7 shows that, for example, supposing that the circular velocity of the thrust duct 2 is 80 percent of the flow velocity of electromagnetic fluid and that the lead angle is =30, the ratio of diminution of frictional loss is about 90 percent.

Figure 8:
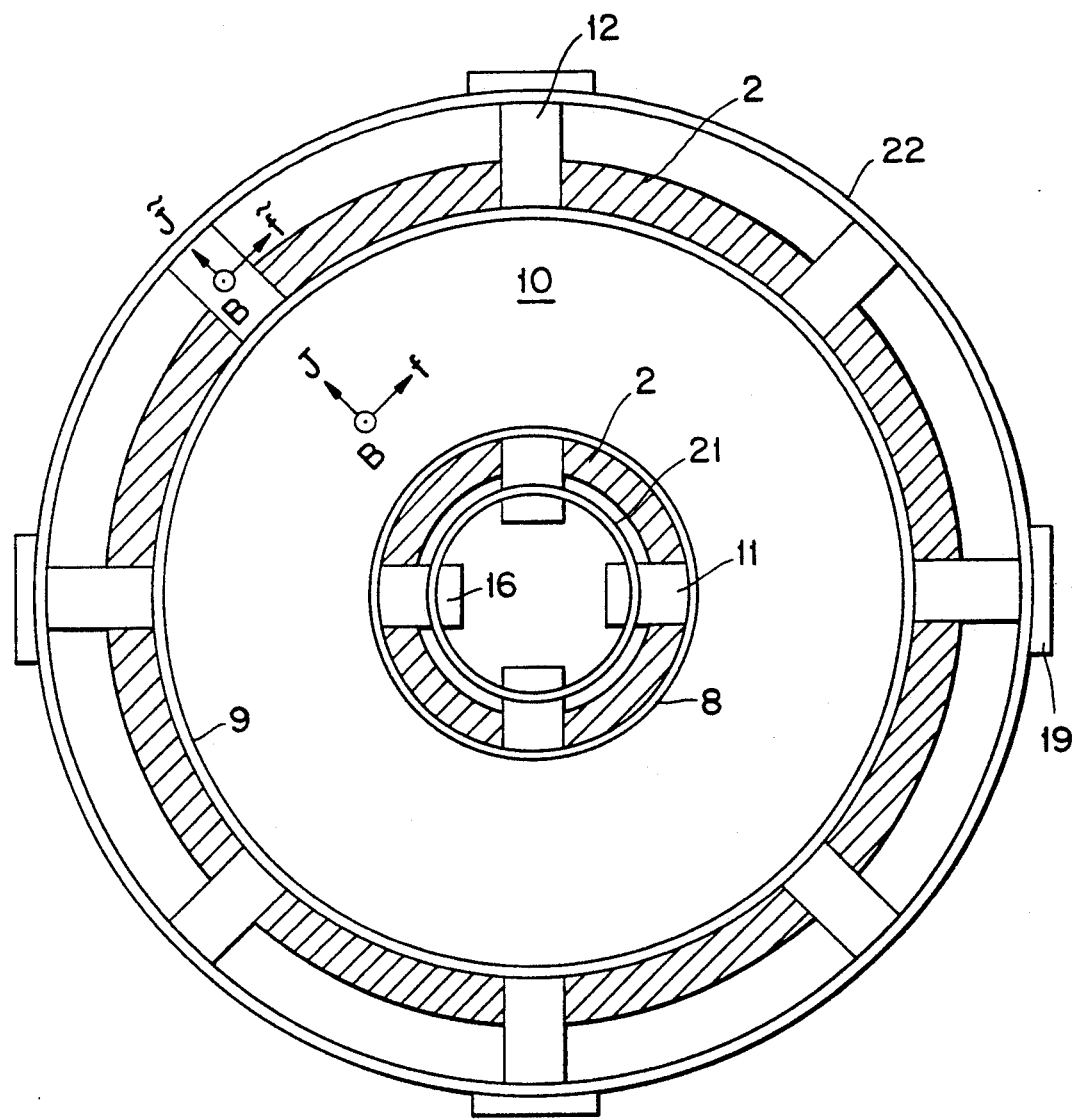
FIG. 8 shows a cross section of a second embodiment of the invention.

FIG. 8 shows an embodiment called a divided and stationary power busbar apparatus in comparison with the above embodiment called a concentric and rotatable power busbar apparatus. In this embodiment, the power busbar apparatus 13,14 of the power supply device 3 have ring busbars 21,22, respectively, and are stationary structures in case of rotating the thrust duct 2. In this type, the sliding friction between stationary ring busbars 21,22 and rotatable current feeders 11,12 is great. This type power busbar apparatus has the advantage of making the weight supporters and the power busbar apparatus in a body.

It is possible that a pair of superconducting solenoid magnets are arranged in row, triming a closed loop magnetic flux line, resulting in the magnetic flux density generated by a pair of superconducting magnets being so much stronger than a single superconducting magnet, as showing in the previous application. PCT/JP89/01153.

INDUSTRIAL APPLICABILITY

The present invention is suitable for a ship propulsion system by generating thrust in the horizontal direction. Thrust may also be generated in the horizontal and vertical directions. It is possible to be used as large sea water pumps, flowing sea water into filed EMTs and discharging from the duct. Using the reverse principle of EMTs, it is possible to use ocean currents (MHD) for power generators.

I claim:

1. A thrust generator, comprising:
   a superconducting solenoid magnet and a power supply device;
   a rotatable spiral thrust duct arranged in a hollow interior portion of said superconducting solenoid magnet;
   a first electrode fixed in an inner side wall of said thrust duct;
   a second electrode arranged in an opposite side wall of said thrust duct;
   said thrust duct having an inlet and outlet provided along a central axis of a said superconducting magnet;
   said power supply device being connected to a current feeder for supplying current to one of said electrodes; and
   means for rotating said thrust duct by generating a Lorentz's force in said current feeder.

2. A thrust generator according to claim 1, wherein said power supply device comprises a power busbar apparatus for supplying electric current to said current feeder, said power busbar apparatus comprising a ringbar concentricly arranged with said thrust duct and a straight busbar extended from said ringbar for making contact with said current feeder.

3. A thrust generator according to claim 2, wherein said power busbar apparatus is fixed to said current feeder to rotate with said thrust duct.

4. A thrust generator according to claim 3, wherein a supply terminal from said power supply device makes contact with an inner wall of said ringbar.

5. A thrust generator according to claim 2, wherein said straight busbar is fixed between said current feeder and said ring busbar.

6. A thrust generator according to any of claims 1 to 5, wherein said first electrode is an anode and said second electrode is a cathode.

7. A thrust generator according to any one of claims 1 to 5, wherein a ratio of an outer radius to an inner radius of said thrust duct is about 3.5.

8. A thrust generator according to claim 3 wherein a supply terminal from said power supply device makes contact with an outer wall of said ringbar.

9. A thrust generator, comprising:
   a solenoid coil type magnet;
   a rotatable, helical thrust duct arranged in a hollow central portion of said solenoid coil type magnet; and
   means for rotating said thrust duct in response to a magnetic field produced by said solenoid coil type magnet.

10. A thrust generator according to claim 9 wherein a ratio of an outer radius of said thrust duct to an inner radius of said thrust duct is about 3.5.

11. A thrust generator according to claim 9 wherein said rotating means comprises a current feeder fixedly connected to an outer surface of said thrust duct for carrying an electrical current substantially perpendicular to a longitudinal axis of said solenoid coil type magnet, said current in said current feeder receiving a Lorentz force from the magnetic field produced by said solenoid coil type magnet.

12. A thrust generator according to claim 11, further comprising a substantially straight busbar for carrying said electrical current to said current feeder, said busbar being fixedly connected to said current feeder and extending substantially parallel to the longitudinal axis of said solenoid coil type magnet.

13. A thrust generator according to claim 12, further comprising a ringbar arranged concentric with the longitudinal axis of said solenoid coil type magnet, said ringbar being fixedly connected to one end of said straight busbar.

14. A thrust generator according to claim 11 further comprising:
   a first electrode arranged on an inner side wall of said thrust duct;
   a second electrode arranged on an outer side wall of said thrust duct opposite to said first electrode;
   said current feeder carrying electric current to at least one of said electrodes.

15. A thrust generator according to claim 14 wherein said first electrode is an anode and said second electrode is a cathode.

16. A method of enhancing a thrust produced by a thrust generator including a rotatable, helical thrust duct arranged in a hollow central portion of a solenoid coil type magnet, said method comprising the step of rotating the thrust duct in response to a magnetic field produced by the solenoid coil type magnet.

* * * * *